March 28, 1950   F. E. WILEY   2,502,240
PROCESS FOR PRODUCING HEAVY GAUGE ARTICLES
FROM THIN THERMOPLASTIC SHEET MATERIAL
Filed Feb. 23, 1946
Fig. I.
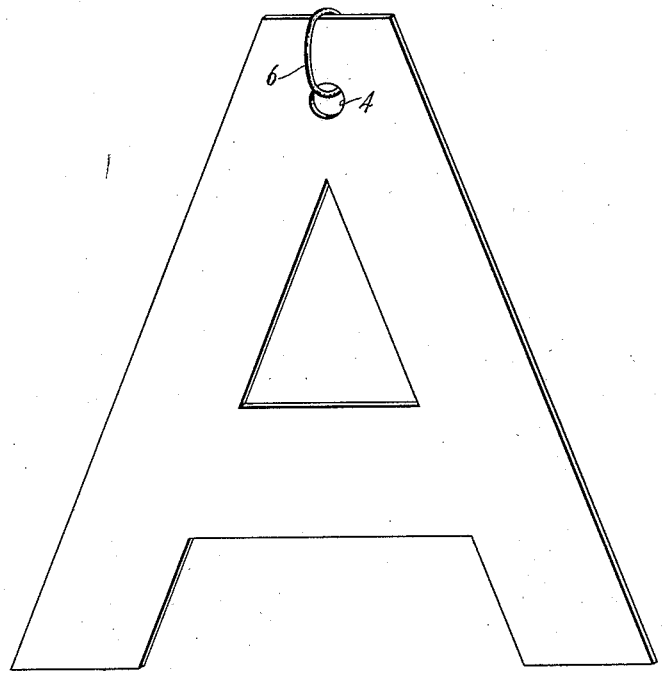
Fig. 2.
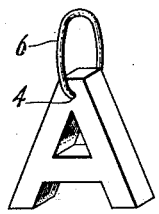
INVENTOR.
FRED E. WILEY
BY Parham + Bates
ATTORNEYS Patented Mar. 28, 1950

2,502,240

UNITED STATES PATENT OFFICE 2,502,240

PROCESS FOR PRODUCING HEAVY GAUGE ARTICLES FROM THIN THERMOPLASTIC SHEET MATERIAL

Fred E. Wiley, Leominster, Mass., assignor to Plax Corporation, Hartford, Conn., a corporation of Delaware Application February 23, 1946, Serial No. 649,574

7 Claims. (Cl. 18—48)

The present invention relates to the production by stamping and punching operations of heavy gauge articles from thermoplastic resin polymers. Such polymers include the vinyl group of which polystyrene is a member.

The decorative properties of these polymers including lustre and transparency, as well as coloring adaptability, make them desirable as materials of which to form novelty as well as industrial articles.

However, the brittleness of certain of these materials, as for example polystyrene, heretofore has prevented economical production of inexpensive novelties from heavy gauge sheet by means of stamping or punching operations.

Accordingly, it is an object of the present invention to provide a process by which relatively thick or heavy gauge articles may be formed of thermoplastic materials by means of a simple shearing or stamping operation.

Some of the advantages of such a process are readily apparent. Other objects and advantages of the invention will be pointed out in the description thereof which follows and which has reference to the accompanying drawings, in which:

Figure 1 is a perspective view of the initial shape and size of a figure cut from oriented polystyrene sheet; and Fig. 2 is a similar view of the shape shown in Fig. 1 after treatment according to this invention.

It has been found that if a thermoplastic resin polymer, such as for example polystyrene sheet, is biaxially oriented so that two dimensions are each stretched, as for example, in the ratio of 4 to 1, the third dimension or thickness of the sheet will decrease to one-sixteenth of its unoriented thickness. Biaxial orientation can be introduced into a sheet by stretching it in two directions at a temperature above the transition temperature of the material, which in the case of polystyrene is 180° F., and below a temperature at which orientation stresses are relieved in the interim following stretching and prior to cooling while so stretched to below the transition temperature. The orientation stresses are thereby captured in the sheet and, in the absence of any appreciable loss, are sufficient to return the sheet to approximately its unoriented shape and thickness when it is heated to 180° F. or above and permitted to exercise its full elastic memory.

It has been discovered that sheet which has been substantially uniformly biaxially oriented, as for example, polystyrene sheet which has been stretched within its elastic memory five to one in each of the two surface dimensions to a thickness of one hundredth of an inch, may be easily, cheaply and rapidly stamped, punched or otherwise cut by means of conventional equipment into any manner of design, shape, or article. Thus, novelty figures or letters, such as the letter "A" illustrated in Fig. 1, may be readily manufactured by a simple cutting operation. When these stamped or punched shapes are heated above the transition temperature of 180° F., the elastic memory of the material causes the shape if unrestrained to be reduced in two dimensions and proportionally increased in the third dimension. Thus the letter "A" illustrated in Fig. 1 is reduced, as illustrated in Fig. 2, to one-fifth of its height and width, and increased in thickness to one-quarter of an inch.

While the biaxial orientation has been described as being substantially equal in both directions of orientation, it will be understood that equality of orientation along the two axes is not essential to the performance of the invention. Thus, for example, the orientation in one direction with regard to the orientation in the direction at right angles thereto may be in the ratio of 2 to 1. In the case of inequality of the biaxial orientation, allowance must be made in the cutting or stamping operation for the difference in amount of shrinkage along the two axes which will occur when the shapes are subsequently heated to relieve orientation stresses and increase the gauge of the shape.

While the invention has been described with respect to polystyrene, its applicability to other orientable resin polymers is apparent.

It will be seen that the present invention has the advantage of permitting several layers of oriented sheet to be stacked and cut in a single operation thereby effecting a considerable savings in the cost of manufacture.

It also will be seen that the present invention provides a method by which heavy gauge articles may be produced from thermoplastic resin sheets by a simple shearing operation which would be impossible with sheet of the thickness of the finally formed article.

Likewise, it is apparent that the forms and shapes produced in accordance with the invention are not limited to the illustration in the drawings. For example, a wide variety of figures of the type used on "charm bracelets" may be produced. If it is desirable to attach a supporting ring to the top of such figures, a hole 4 may be punched in the figure and a metal ring 6 positioned therein as illustrated in Fig. 1. The subsequent heating and shrinking operation causes the ring 6 to be firmly secured in the article, as illustrated in Fig. 2, and a series of such charms may be attached to a necklace or bracelet chain.

Other adaptations of the invention will suggest themselves to those skilled in the art.

What is claimed is:

1. A process for producing a heavy gauge article of a thermoplastic resin polymer which comprises cutting said article from light gauge substantially uniformly biaxially oriented sheet of said polymer and thereafter freely relaxing all of the orientation forces therein to increase the gauge of the article.

2. The process of producing shapes by means of a stamping operation from polystyrene sheet at least one-quarter inch thick which comprises biaxially stretching and molecularly orienting said sheet substantially uniformly to approximately one-hundredth of an inch in thickness, stamping the desired shapes from said oriented sheet, and heating said shapes at a temperature above 130° F. substantially without restraint to relax all orientation stresses therein and permit shrinkage of the shapes in the direction of orientation and thickening in the third dimension to the thickness of the original sheet.

3. The process of manufacturing an article from molecularly biaxially oriented sheet material having a biaxial elastic memory which comprises shearing the sheet to the shape of the article exaggerated in such a way that when the material is permitted to exercise freely its elastic memory the article assumes its unexaggerated shape, and releasing the biaxial orientation of the portion of the sheet constituting the article while permitting the material of said article to exercise freely all of its elastic memory.

4. The process as defined in claim 3 wherein the sheet material is thermoplastic and heat is applied to the portion of the sheet constituting the article to release the orientation and permit the thermoplastic material to exercise all of its elastic memory freely.

5. The process as defined in claim 3 wherein a plurality of substantially flat, stacked layers of the sheet material are concurrently cut to shape by a single shearing operation.

6. The process as defined in claim 5 wherein the sheet material is thermoplastic and heat is applied to the portions of the sheets constituting the articles to release the orientation and permit the thermoplastic material of each article to exercise all of its elastic memory freely.

7. The process of making heavy gauge articles from thermoplastic material capable of molecular orientation which includes cutting a portion from a bilaterally oriented sheet to a design exaggerated in such a way that upon permitting said portion to exercise freely its elastic memory the portion assumes the shape of the unexaggerated design, the sheet being severed across the lines of orientation by the cutting operation, and heating said portion of the sheet while substantially unrestrained to permit it to shrink laterally and increase in thickness to the shape of the unexaggerated design.

FRED E. WILEY.

REFERENCES CITED

The following references are of record in the file of this patent:

UNITED STATES PATENTS

| Number | Name | Date |
|---|---|---|
| 2,027,922 | Currie | Jan. 14, 1936 |
| 2,241,225 | Talbot | May 6, 1941 |
| 2,377,928 | Fielitz et al. | June 12, 1945 |

FOREIGN PATENTS

| Number | Country | Date |
|---|---|---|
| 468,762 | Great Britain | July 12, 1937 |